United States Patent [19]
Rodgers et al.

[11] Patent Number: 5,636,374
[45] Date of Patent: Jun. 3, 1997

[54] METHOD AND APPARATUS FOR PERFORMING OPERATIONS BASED UPON THE ADDRESSES OF MICROINSTRUCTIONS

[75] Inventors: Scott D. Rodgers; Keshavan K. Tiruvallur, both of Hillsboro; Michael W. Rhodehamel, Beaverton; Kris G. Konigsfeld, Portland; Andrew F. Glew, Hillsboro; Haitham Akkary, Portland; Milind A. Karnik, Aloha; James A. Brayton, Beaverton, all of Oreg.

[73] Assignee: Intel Corporation, Santa Clara, Calif.

[21] Appl. No.: 470,842

[22] Filed: Jun. 6, 1995

Related U.S. Application Data

[63] Continuation of Ser. No. 177,272, Jan. 4, 1994, abandoned.

[51] Int. Cl.$^6$ ........................................ G06F 9/30
[52] U.S. Cl. ..................... 395/571; 395/384; 395/568
[58] Field of Search .................... 395/375, 425, 395/427, 392, 393, 394, 571, 384, 568; 364/130

[56] References Cited

U.S. PATENT DOCUMENTS

| | | | |
|---|---|---|---|
| 4,521,858 | 6/1985 | Kraemer et al. | 395/425 |
| 5,046,040 | 9/1991 | Miyoshi | 364/949.1 |
| 5,091,846 | 2/1992 | Sachs et al. | 395/200 |
| 5,136,714 | 8/1992 | Braudaway et al. | 395/725 |
| 5,179,679 | 1/1993 | Shoemaker | 395/425 |
| 5,193,167 | 3/1993 | Sites et al. | 395/425 |
| 5,251,306 | 10/1993 | Tran | 395/375 |
| 5,287,522 | 2/1994 | Brown et al. | 395/725 |
| 5,307,477 | 4/1994 | Taylor et al. | 395/425 |

OTHER PUBLICATIONS

*Motorola Microprocessor Manual* "(Move from CCR)" 1989 pp. 7.60–7.63.
Mc68030 Motorola Microprocessor User's Manual Second Edition, 1989 by Motorola, Inc.

*Primary Examiner*—William M. Treat
*Attorney, Agent, or Firm*—Blakely, Sokoloff, Taylor & Zafman

[57] ABSTRACT

In a microprocessor, an apparatus and method for performing memory functions and issuing bus cycles. Special microinstructions are stored in microcode ROM. These microinstructions are used to perform the memory functions and to generate the special bus cycles. Initially, an address corresponding to a requested operation to be performed is generated for one of these special microinstructions. That special microinstruction, along with its address, is then transmitted over the bus to the various units of the microprocessor. When each of the units receives the microinstruction, it determines whether that microinstruction is to be ignored based on the address. If a particular unit ignores the microinstruction, the microinstruction is forwarded to subsequent units in the pipeline for processing. Otherwise, if that particular unit performs the requested operation as specified by the microinstruction's address.

48 Claims, 3 Drawing Sheets

METHOD AND APPARATUS FOR PERFORMING OPERATIONS BASED UPON THE ADDRESSES OF MICROINSTRUCTIONS

This is a continuation of application Ser. No. 08/177,272, filed Jan. 4, 1994 now abandoned.

FIELD OF THE INVENTION

The present invention pertains to the field of microprocessors. More particularly, the present invention relates to an apparatus and method for issuing special bus cycles and for performing memory subsystem functions directed by microcode in a microprocessor.

BACKGROUND OF THE INVENTION

A computer system can be broken into three basic blocks: a central processing unit (CPU), memory, and input/output (I/O) units. These blocks are interconnected by means of a bus. An input device such as a keyboard, mouse, disk drive, analog-to-digital converter, etc., is used to input instructions and data to the computer system via the I/O unit. These instructions and data can be stored in memory. The CPU retrieves the data stored in the memory and processes the data as directed by the stored instructions. The results can be stored back into memory or outputted via the I/O unit to an output device such as a printer, cathode-ray tube (CRT) display, digital-to-analog converter, etc.

Traditionally, the CPU consisted of a single semiconductor chip known as a microprocessor. This microprocessor executed the programs stored in the main memory by fetching the instructions, examining them, and then executing them one after another. Due to rapid advances in semiconductor technology, faster, more powerful and flexible microprocessors were developed to meet the demands imposed by ever more sophisticated and complex software.

Presently, the state-of-the-art in microprocessor design has come to a point where designing the next generation of microprocessors is incredibly costly, labor-intensive, and time-consuming. However, new applications, such as multimedia, which integrates text, audio, speech, video, data communications, and other time-correlated data to create a more effective presentation of information, requires a large amount of processing power to handle in a real-time environment. And with the explosion in network and file server applications, there is a need for processing vast amounts of data in a fast, efficient manner. The trend is for even more complex and lengthier software programs. The computational requirements associated with operating these applications in real-time is starting to overwhelm even the most powerful of microprocessors.

One solution is to implement multiple processors. A singularly complex task can be broken into sub-tasks. Each sub-task is processed individually by a separate processor. This use of multiple processors allows various tasks or functions to be handled by more than one CPU so that the computing power of the overall system is enhanced. And depending on the complexity of a particular job, additional processors may be added. Furthermore, utilizing multiple processors has the added advantage that two or more processors may share the same data stored within the system. In order to further boost the performance of the system, specialized controllers, graphics accelerators, digital signal processors, co-processors, etc., are being implemented.

Consequently, the interface between all these various devices can be rather complex. Devices interfaced to the microprocessor need to be informed as to certain status of the microprocessor. For example, these devices need to be informed as to whether the microprocessor has stopped running and the reason why it has stopped running. In other instances, the microprocessor needs to send an acknowledgment that a particular signal has been asserted or acknowledgment that it has been synchronized to a particular signal. Furthermore, branch trace messages are used by devices external to the microprocessor to trace execution for debugging and performance monitoring purposes.

In addition to the problem of issuing special bus cycles, there is a need for a mechanism to request cache and data translation lookaside buffer (DTLB) flushes. In the case of DTLB flushes, both single line and entire TLB flushes are required. Only single line flushes are required for the data cache unit (DCU).

One method for handling the additional interfacing would be to add extra hardware. However, this solution is relatively expensive, consumes circuit board space, and is not easily expandable.

Thus, there is a need in the prior art for an apparatus and method for issuing special bus cycles without incorporating extra, dedicated hardware. It would be preferable if such an apparatus and method were to have the flexibility of accepting additional functions, such as performing particular cache and TLB functions (e.g., flush, invalidate, etc.).

SUMMARY OF THE INVENTION

The present invention provides an apparatus and method for microcode to make requests to the various units (e.g., the DTLB, DCU, bus unit, etc.) for special actions to be taken. These requests are conveyed using special operations which include both stores and loads. Load special operations are used when the request requires data to be returned. Store special operations are used in all other cases.

Logically, any special load or store microinstruction can support any of the specified operations. For each of these microinstructions, their particular linear address determines the type of cycle that is generated. In other words, the address provided as a result of the address calculation determines the actions to be performed. The address can be obtained in any way that a normal address is obtained. However, since the address which determines the operation to be performed is the linear address, no linear to physical address translation is performed for these accesses.

Each unit that recognizes one of these microinstructions examines the received address to determine the particular action to be taken. If the specified action is to be executed in the unit examining the address, the unit performs the requested action. Otherwise, the microinstruction is ignored by that unit and passed on to other units in the pipeline. Due to the pipeline in the memory subsystem, if a particular unit does not recognize the command provided by one of these microinstructions, it passes the microinstruction downstream to the other units so that they can check the address. This, however, is not required for the invention in cases where connections are provided to send the command to multiple units simultaneously. It should be noted that in the general design, there is no correlation between the different microinstructions that can be specified and the address which specifies the operation to be performed.

Initially, the microinstruction is stored in microcode ROM. This microinstruction is sent to an address generation unit (AGU). The AGU proceeds to generate the address that corresponds to the requested operation to be performed. Next, this microinstruction is sent over the bus to the various units of the microprocessor. Each of the units examines the microinstruction to determine whether it recognizes that microinstruction. If a unit recognizes the microinstruction, a determination is made as to whether the specified action is to be executed in that unit. If the specified action is not to be executed in that unit, the microinstruction is ignored. Otherwise, the unit performs the operation indicated by the address. In the case of a special load, the requested data is also returned by the unit when the request has been completed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for requesting special bus cycles and special memory subsystem operations is described. In the following description, for purposes of explanation, numerous specific details are set forth, such as buffers, bus widths, data sizes, cache systems, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention. Furthermore, the present invention can be implemented in a variety of semiconductor processes such as silicon, gallium arsenide, etc. The present invention can also be designed as a single chip or integrated on several individual chips.

Figure 1:
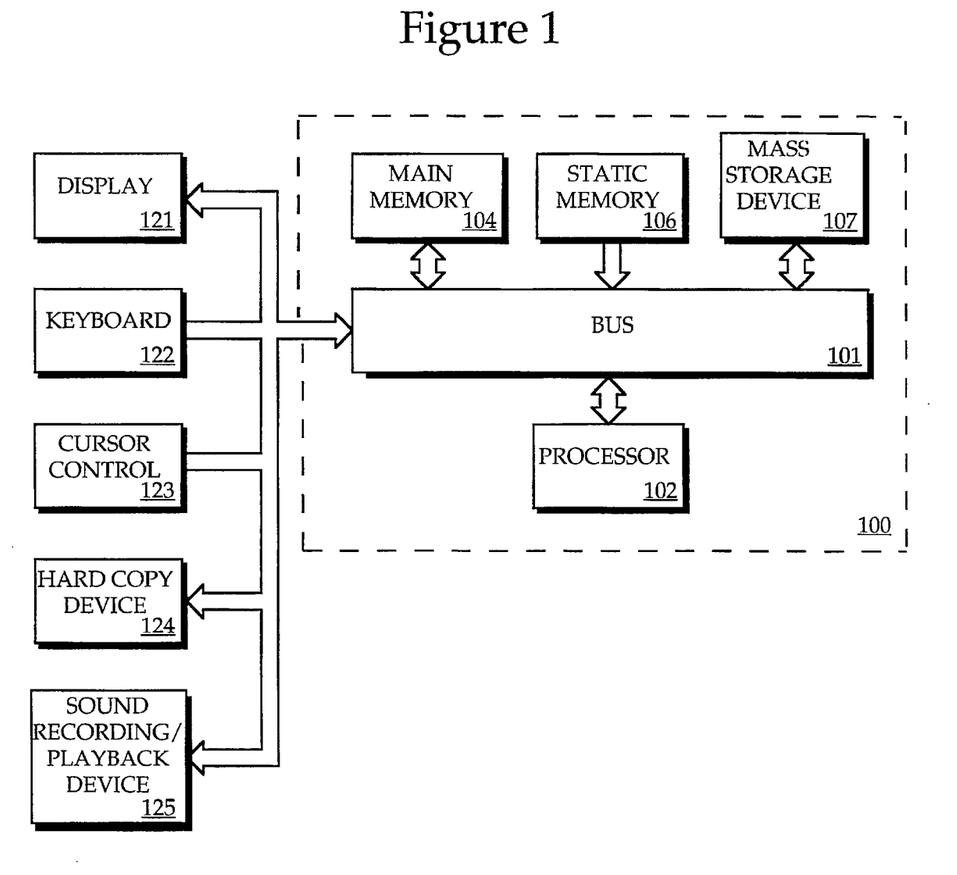
FIG. 1 shows the computer system upon which a preferred embodiment of the present invention can be implemented.

Referring to FIG. 1, the computer system upon which a preferred embodiment of the present invention is implemented is shown as 100. Computer system 100 comprises a bus or other communication means 101 for communicating information, and a processing means 102 coupled with bus 101 for processing information. Processor 102 includes, but is not limited to microprocessors such as the Intel™ architecture microprocessors, PowerPC™, Alpha™, etc. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions.

Computer system 100 may further be coupled to a display device 121, such as a cathode ray tube (CRT) or liquid crystal display (LCD) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. Furthermore, a sound recording and playback device 125, such as a speaker and microphone may optionally be coupled to bus 101 for interfacing with computer system 100. Note that any or all of the components of system 100 and associated hardware may be used in a preferred embodiment, however, it can be appreciated that any type of configuration of the system may be used for various purposes as the user requires.

Figure 2:
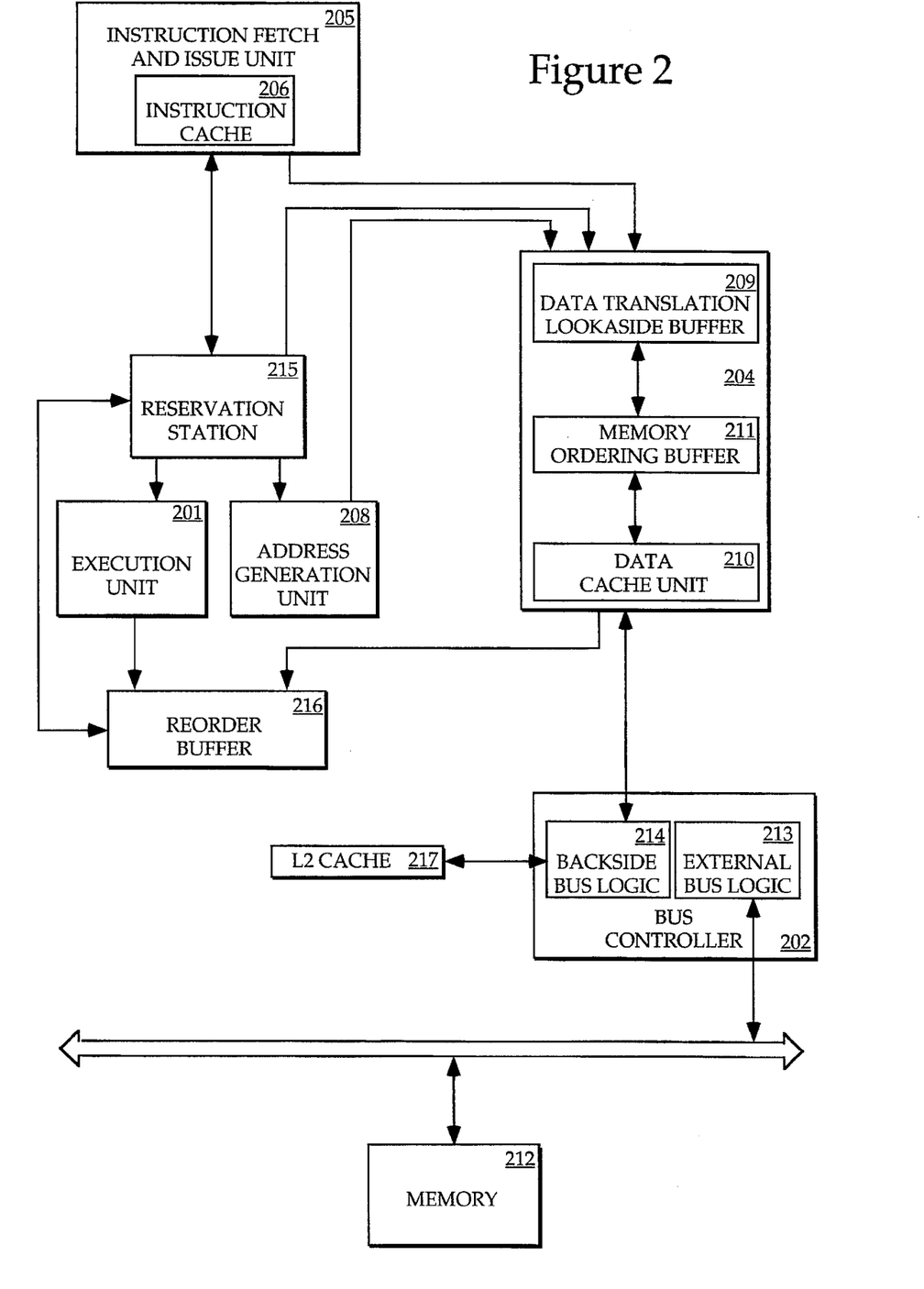
FIG. 2 shows a block diagram illustrating an exemplary processor incorporating the teachings of the present invention.

Referring now to FIG. 2, a block diagram illustrating an exemplary processor 102 incorporating the teachings of the present invention is shown. The exemplary processor 102 comprises an execution unit (EU) 201, a bus controller 202, a memory cluster 204, an instruction fetch and issue unit 205 with an integrated instruction cache 206, reservation station 215, reorder buffer 216, and an address generation unit (AGU) 208. These elements are coupled to each other as illustrated. Together they cooperate to fetch, issue, execute, and save execution results of instructions in a pipelined manner.

RS 215 is a small buffer that holds uops that have not yet executed and dispatches them to the EU 201 according to data dependencies and availability. ROB 216 is the buffer where speculative integer results are collected, re-ordered into original program order, and then retired.

The instruction fetch and issue unit 205 fetches instructions from an external memory or its internal instruction cache 206 through the memory cluster 204 and bus controller 202 via an external system bus. Bus controller 202 manages transfers of data between external components and processor 102. In addition, it also manages cache coherency transfers. Bus controller 202 is comprised of an external bus logic (EBL) 213 and a backside bus logic (BBL) 214. The EBL 213 controls data transfers to the system bus 210, while the BBL controls data transfers to the L2 cache 217.

The instruction fetch and issue unit 205 then issues these instructions to the reservation station 215 in an in-order sequence. The instructions are held in the reservation station (RS) 215 until all operands are available. At that time, the microinstruction is then sent to either the AGU 208 or the execution unit 201 by the RS 215 for execution. Basically, the execution unit 201 performs such functions as add, subtract, logical AND, and integer multiply. The results are written back to the reorder buffer (ROB) 216, which reorders the state updates requested by the microinstruction so that they occur in program order.

In similar fashion, the RS 215 holds and forwards the load and store instructions to the AGU 208. It is the function of the AGU 208 to generate the address. The loads and stores are sent to the memory clusters, which orders the accesses and performs the requested accesses. The results of the accesses are sent to the reorder buffer 216, which commits the states of these instructions to whatever permanent architectural state that was designated by the original source code.

The special bus cycle microinstructions, as well as regular loads and stores, are sent to the AGU 208 by the RS 215. The AGU 208 receives effective address information (base, index, scale, and displacement) and a designator indicating the segment to be used. The AGU uses this information to calculate the linear address for the access. This then passes to the DTLB 209.

For normal loads and stores, the DTLB 209 translates the linear address from the AGU and passes it on to the memory ordering buffer (MOB) 211. The MOB 211 properly orders the request and sends it to the DCU 210 for servicing. In the case of a normal load or store, it determines whether the access hits the cache. If so, the data is returned from the cache. Otherwise the request is sent to the EBL 213 to obtain the data from the L2 data cache 215.

When the EBL 213 receives a normal load or store request from the DCU 210, it checks the Level 2 cache 217 to see if the access hits the cache. If a load hits the cache, it returns the data from the cache to the DCU 210. The DCU 210 returns this data to the ROB 216. If a store hits the cache, data is written into the cache. If the access misses the cache, it is sent to the BBL 214 for handling. When the BBL 214 receives a normal load or store request from the EBL 213, it places a request on the bus to either obtain the load data from memory or write the store data to memory. In the case of a load, the data is returned to the DCU 210. The DCU 210 returns this data to the ROB 216.

The memory cluster 204 respond to the load instructions immediately, forwarding data if necessary. In contrast, store instructions are buffered. In other words, instructions are not necessarily executed/forwarded in the order they were issued. Some instructions are speculatively executed/forwarded. The results of the integer, floating point, and load instructions are buffered, and then retired or committed in order. In comparison, the buffered store instructions are retired or committed in order and then executed in the "background," at the convenience of the memory system. Speculative integer, floating point, and load execution results and buffered stores generated by code located at the target of mispredicted branches are purged.

The instruction fetch and execution unit 205 is intended to represent a broad category of instruction fetching and issuing elements found in many computer systems. Their constitutions and functions are well known and will not be further described. In the presently preferred embodiment, the instruction fetch and issue unit 205 includes an instruction cache 206. The instruction cache 206 is a fast local memory that holds the instructions to be executed. When a program attempts to access an instruction that is not yet or no longer in the cache, the processor must wait until hardware fetches the desired instructions from another cache or memory downstream. It is the responsibility of the instruction fetch and issue unit 205 to decide which instruction cache entry ought to be accessed next for maximal program performance.

In the currently preferred embodiment, the instruction cache 206, memory cluster 204, and L2 cache 217 exist in a memory hierarchy. The hierarchy is comprised of a small but extremely fast L1 cache. If a memory access to the L1 cache results in a miss, the access is passed on to a bigger, but slower, L2 cache. And if that also results in a miss, the memory access goes to an L3 cache or to the main memory if the processor happens to not have an L3 cache. When an access misses the DTLB, a special state machine in the DTLB, called the page miss handler (PMH), walks the page tables using loads sent to the MOB. The translation information obtained from the loads is then placed in the DTLB.

There is no requirement for the instructions to be fetched from aligned memory locations. In other words, an instruction may be fetched from memory locations spanning two cache lines. However, it will be appreciated that the present invention may be practiced with or without an instruction cache, or with a combined instruction/data cache. If an instruction cache is implemented, page misses may be handled by a dedicated page miss handler, and instructions may be fetched from aligned memory locations.

Basically, the present invention provides an apparatus and method for microcode to make requests to the various units (e.g., the DTLB, DCU, bus unit, etc.) for special actions to be taken. The requests are made using two special load and two special store microinstructions. The special load microinstructions are used to issue commands which require data to be returned (e.g., interrupt acknowledge (INTA) cycles, which return the vector for the interrupt signaled). The special store microinstructions are used to issue commands which require data input (e.g., branch trace messages which require the location and target of the branch) and which do not require data to be returned.

In the currently preferred embodiment the four microinstructions defined to support the ability to request these operations are: load special (no fence), load special fence, store special (no fence), and store special fence. The fence forms of these microinstructions provide stricter memory ordering requirements than the non-fenced microinstructions. All pending accesses which occur before the fenced microinstruction (in program order) must complete before the fenced operation is executed, and all subsequent accesses (in program order) are forced to wait until the fence operation completes.

For each of these four microinstructions, their particular linear address determines the type of operation that is requested. In other words, the address provided as a result of the linear address calculation determines the actions to be performed. The linear address is calculated by scaling the index value indicated by the microinstruction, adding the effective address base and displacement value provided by the microinstruction to the scaled index value, and adding that value the base address specified in the segment register indicated by the microinstruction. The linear address can be obtained in any way that a normal address is obtained. For example, the address can be computed from a number of register values, a single register value, a microcode immediate value embedded in the microinstruction itself or obtained from a constant ROM.

Each unit that recognizes one of the cycles examines the received address to determine the particular action to be taken. If the specified action is to be executed in the unit examining the address, the unit performs the requested action. Otherwise, the microinstruction is ignored and passed on to other units by that unit.

In the currently preferred embodiment, the address is interpreted as follows. Bits 0, 1, and 2 are used to signify an EBL request (000), a flush L1 cache request (001), an invalidate L1 cache request (010), and a restricted cache (RC) flush L1 cache request (011). The RC memory type is intended for use in frame buffers. It is essentially identical to a conventional writeback cached memory, except that no more than a given amount (e.g., 32K) of RC memory will ever be cached, regardless of the size of the processor's L1 or L2 caches. Bits 3 and 4 are used to indicate the way for set/way operations. Otherwise, these bits are set to 0. Bits 5–19 (bits 5–11 for L1 operations) are used to indicate the set for set/way operations. Otherwise, these bits are set to 0. And bits 20–31 are used to indicate the particular EBL operation to be performed. For all other operations, these bits are set to 0. It should be noted that many different types of encoding schemes which allow the commands to be specified can be utilized by the present invention.

The four different forms of microinstructions are utilized by the present invention. This provides microcode with the ability to specify whether data can be returned or not, and whether fencing is to be provided or not for each special operation request. All four forms are required. Logically, any operation can be requested using any of the microinstructions by specifying the proper address. Furthermore, it should be noted that in the general design, there is no correlation between the different operations that can be specified by the address and the microinstruction.

In the case of special loads and stores, the linear address is not translated into a physical address. The DTLB 209 examines the address to determine if the request is directed to the unit. If so, it performs the requested operation. If it is a load, it also returns the requested data when the operation is complete. If the DTLB 209 is not designated to handle the special operation request, it passes the operation to the MOB 211 for servicing by the DCU or bus. In the case of a special bus cycle load or store, the DCU 210 simply examines the address to determine if the request is directed to the unit. If so, it performs the requested operation. If it is a load, it also returns the requested data when the operation is complete. Otherwise, it passes the request to the EBL 213 for handling.

When the EBL 213 receives a special load or store from the DCU 210, it checks the address to see if the request is directed to the Level 2 data cache 217. If so, it performs the requested operation. If it is a load, it also returns the requested data when the operation is complete. Otherwise, it passes the request to the BBL 214 for handling. When the BBL 214 receives a special load or store from the DCU 210, it checks the address to see if the request is directed to the BBL 214. If so, it performs the requested operation. If it is a load, it also returns the requested data when the operation is complete.

Figure 3:
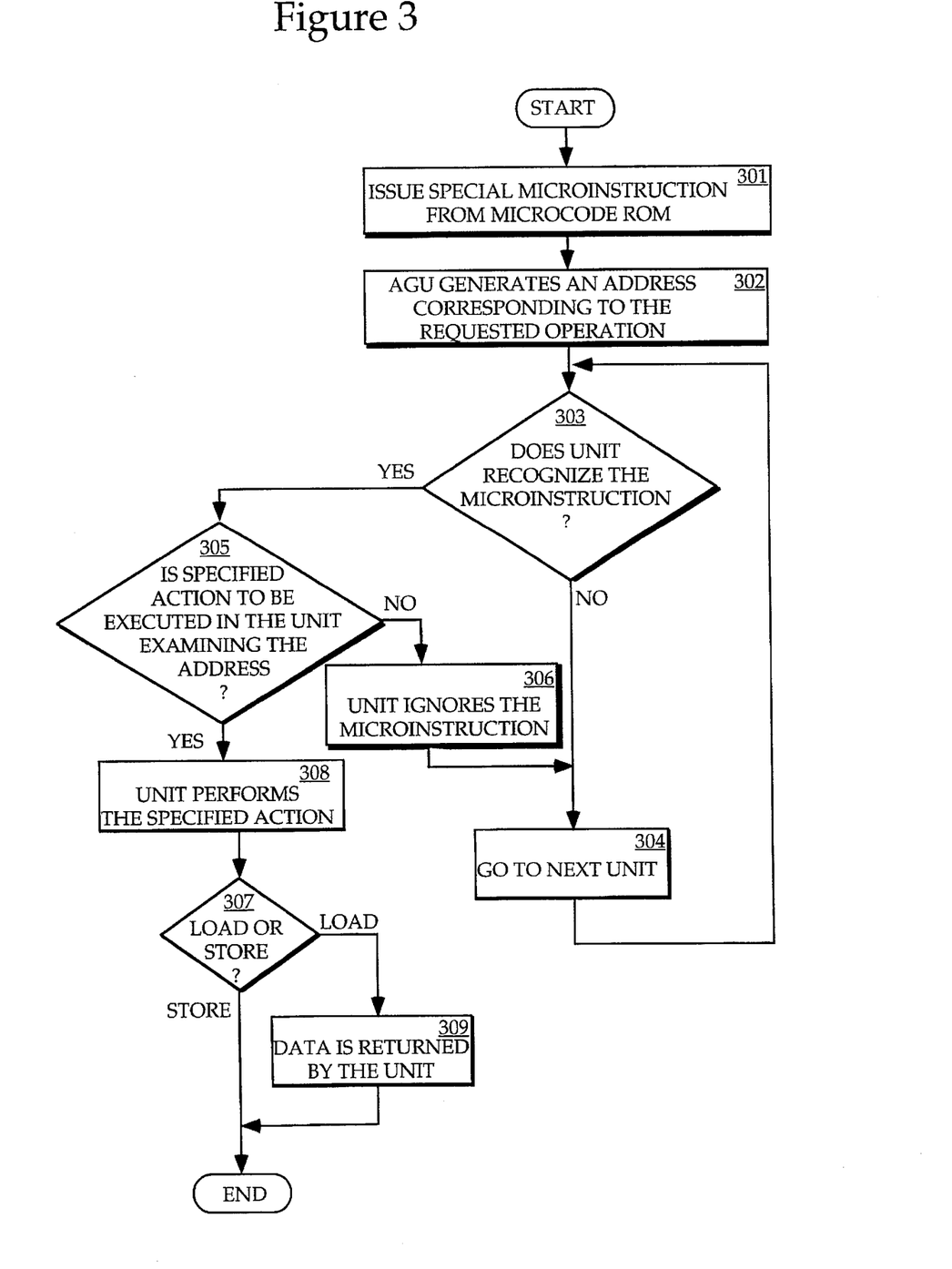
FIG. 3 shows a flowchart describing the steps for executing special bus cycles in accordance to microcode.

FIG. 3 is a flowchart illustrating the steps for executing the special bus cycles in accordance with a microcode request. Initially, the microinstruction is stored in memory (e.g., microcode ROM), step 301. This microinstruction is sent to the AGU. The AGU proceeds to generate an address that corresponds to the requested operation to be performed, step 302. Next, this microinstruction is sent over the bus to the various units of the microprocessor. Each of the units examines the microinstruction to determine whether it recognizes that microinstruction, steps 303. If it does not, the microinstruction is forwarded to another unit, step 304.

If a unit recognizes the microinstruction, a determination is made as to whether the specified action is to be executed in that unit, step 305. If the specified action is not to be executed in that unit, the microinstruction is ignored, step 306. Otherwise, the unit performs the specified action, step 308. Then, a determination is made as to whether the microinstruction calls for a load or a store operation, step 307. If it is a load operation, the unit returns the data generated by the command, step 309.

An example of the generation of a special interrupt acknowledge bus cycle is now described. Because data is to be returned and the operation must be fenced, the microinstruction used for an interrupt acknowledge is a load special fence. Next, a special data value corresponding to an interrupt acknowledge operation is selected for the address of the load special fence micro-operation. This value indicates to the appropriate unit (e.g., the EBL) that this is an interrupt acknowledge.

Thereupon, the load special fence microinstruction having the special address is issued to the various units. When this load special fence microinstruction is received by the DTLB, the DTLB determines that the microinstruction does not pertain to it. The DTLB ignores the microinstruction and passes it on to the DCU. Note that, even though the command is ignored, the operation (load special, load special fence, store special, or store special fence) and address are passed on to subsequent units in the pipe and are ordered by the MOB as described earlier. Similarly, the DCU ignores this load special fence microinstruction. Finally, the microinstruction is sent to the BBL. Upon receiving this load special fence, the BBL recognizes that it must perform the specified function (i.e., interrupt acknowledge). In response, the BBL polls the Advanced Programmable Interrupt Controller (APIC) to determine whether the APIC has the interrupt vector. If the APIC happens to have the requested vector, the vector is returned to the ROB 216 in the same manner as a normal load. Otherwise, the BBL sends an interrupt acknowledge bus cycle to the EBL. The EBL transmits an interrupt acknowledge bus cycle, waits for the vector to be returned, and returns the vector to the DCU and eventually to the ROB 216 in the same manner as data for a normal load. The returned data, containing the interrupt vector, is eventually written into the destination register specified by the load special fence microinstruction.

The definitions for each of the four special microinstructions, along with a list of special bus cycles supported by these operations and how each particular unit handles each of these microinstructions are now described in detail below.

Load Special Microinstruction

The important points about this microinstruction are as follows. It is issued to the same execution unit as stores to allow the MOB 211 to order the operation with respect to stores, and data is returned using the same data return port as for loads. Furthermore, the AGU 208 generates the linear address for the microinstruction in the same manner used for normal loads.

The DTLB 209 does not perform linear address translation. It checks the linear address for the microinstruction to determine whether the operation is directed to the DTLB 209. If so, it executes the operation and returns the requested data to the ROB 216 when the operation completes. Otherwise, it passes the operation to the MOB.

The MOB 211 orders this microinstruction with respect to stores, meaning that all stores which precede it in program order will occur before the microinstruction is issued, and all subsequent stores in program order wait until this microinstruction completes before being executed. Loads which occur after this microinstruction in program order may execute before this microinstruction completes. The microinstruction will not execute until its result is ready to be committed to system state by the ROB 216. At the appropriate time, the MOB 211 sends operations passed down by the DTLB 209 to the DCU 210. The DCU 210 checks the linear address for the microinstruction to determine whether the operation is directed to the DCU 210. If so, it executes the operation and returns the requested data to the ROB 216 when the operation completes. Otherwise, it passes the operation to the EBL 213. The DCU 210 may have other accesses pending when it executes the operation.

The EBL 213 examines the operation to determine whether the operation is directed to the Level 2 data cache (L2) 217. If so, it executes the operation and returns the requested data to the DCU 210, which forwards it to the ROB 216, when the operation completes. Otherwise, it passes the operation to the BBL 214. The EBL 213 may have other accesses pending when it executes the operation. The BBL 214 examines the operation to determine whether the operation is directed to the BBL 214. If so, it executes the operation and returns the requested data to the DCU 210, which forwards it to the ROB 216, when the operation completes. The BBL 214 may have other accesses pending when it executes the operation.

Load Special Fence Microinstruction

The important points about this microinstruction are as follows. It is issued to the same execution unit as stores to allow the MOB 211 to order the operation with respect to stores, and data is returned using the same data return port as for loads. Furthermore, the AGU 208 generates the linear address for the microinstruction in the same manner used for normal loads. The DTLB 209 does not perform linear address translation. It simply checks the linear address for the microinstruction to determine whether the operation is directed to the DTLB 209. If so, it executes the operation and returns the requested data to the ROB 216 when the operation completes. Otherwise, it passes the operation to the MOB 211.

The MOB 211 ensures that all accesses which precede the microinstruction in program order will occur before the microinstruction is issued, and all subsequent accesses in program order wait until this microinstruction completes before being executed. The microinstruction will not execute until its result is ready to be committed to system state by the ROB 216. The operation will be executed before any subsequent memory requests in program order are allowed to occur. At the appropriate time, the MOB 211 sends operations passed down by the DTLB 209 to the DCU 210. The DCU 210 completes all pending accesses and checks the linear address for the microinstruction to determine whether the operation is directed to the DCU 210. If so, it executes the operation and returns the requested data to the ROB 216 when the operation completes. Otherwise, it passes the operation to the EBL 213.

The operation is examined to determine whether it is directed to the Level 2 data cache (L2) 217. If so, it executes the operation and returns the requested data to the DCU 210, which forwards it to the ROB 216, when the operation completes. Otherwise, it passes the operation to the BBL 214. The BBL 214 completes all pending accesses and examines the operation to determine whether the operation is directed to the BBL 214. If so, it executes the operation and returns the requested data to the DCU 210, which forwards it to the ROB 216, when the operation completes.

Store Special Microinstruction

The important points about this microinstruction are as follows. It is issued to the same execution unit as stores to allow the MOB 211 to order the operation with respect to stores, and data for the operation can be provided along with the address using the same method for communicating data as is used for normal store data. Furthermore, the AGU generates the linear address for the microinstruction in the same manner used for normal stores. The DTLB 209 does not perform linear address translation. It simply checks the linear address for the microinstruction to determine whether the operation is directed to the DTLB 209. If so, it executes the operation. Otherwise, it passes the operation to the MOB 211.

The MOB 211 orders this microinstruction with respect to stores, meaning that all stores which precede it in program order will occur before the microinstruction is issued, and all subsequent stores in program order wait until this microinstruction completes before being executed. The microinstruction is permitted to complete before the operation is actually executed by the DCU 210, EBL 213, or BBL 214. This means that subsequent stores may complete before the operation is executed by the DCU 210, EBL 213, or BBL 214. Loads which occur after this microinstruction in program order may execute before this microinstruction completes. The microinstruction will not execute until its result is ready to be committed to system state by the ROB 216. At the appropriate time, the MOB 211 sends operations passed down by the DTLB 209 to the DCU 210. The DCU 210 checks the linear address for the microinstruction to determine whether the operation is directed to the DCU 210. If so, it executes the operations. Otherwise, it passes the operation to the EBL 213. The DCU 210 may have other accesses pending when it executes the operation.

The EBL 213 examines the operation to determine whether the operation is directed to the Level 2 data cache (L2) 217. If so, it executes the operation. Otherwise, it passes the operation to the BBL 214. The EBL 213 may have other accesses pending when it executes the operation. The BBL 214 examines the operation to determine whether the operation is directed to the BBL 214. If so, it executes the operation. Note that the BBL 214 may have other accesses pending when it executes the operation.

Store Special Fence Microinstruction

The important points about this microinstruction are as follows. It is issued to the same execution unit as stores to allow the MOB 211 to order the operation with respect to stores, and data for the operation can be provided along with the address using the same method for communicating data as is used for normal store data. Furthermore, the AGU generates the linear address for the microinstruction in the same manner used for normal stores. The DTLB 209 does not perform linear address translation. It simply checks the linear address for the microinstruction to determine whether the operation is directed to the DTLB 209. If so, it executes the operation. Otherwise, it passes the operation to the MOB 211.

The MOB 211 ensures that all accesses which precede the microinstruction in program order will occur before the microinstruction is issued, and all subsequent accesses in program order wait until this microinstruction completes before being executed. The microinstruction will not execute until its result is ready to be committed to system state by the ROB 216. The operation will be executed before any subsequent memory requests in program order are allowed to occur. At the appropriate time, the MOB 211 sends operations passed down by the DTLB 209 to the DCU 210. The DCU 210 completes all pending accesses and checks the linear address for the microinstruction to determine whether the operation is directed to the DCU 210. If so, it executes the operation. Otherwise, it passes the operation to the EBL 213.

The EBL 213 completes all pending accesses and examines the operation to determine whether the operation is directed to the Level 2 data cache (L2) 217. If so, it executes the operation. Otherwise, it passes the operation to the BBL 214. The BBL 214 completes all pending accesses and examines the operation to determine whether the operation is directed to the BBL 214. If so, it executes the operation.

The following is a description of the currently preferred special bus cycle operations. It should be noted that operations other than those listed below can also be incorporated by the present invention.

Interrupt Acknowledge (INTA)

Microcode uses load_special_fence to convey this command to the APIC. The DTLB 209, DCU 210, and EBL 213 do not act on this command. The EBL 213 queries the APIC to determine whether it contains the vector for the interrupt. If the APIC has the vector, it returns it to the EBL 213, which returns it to the DCU 210, which forwards it to the ROB, as the data for the special load. Otherwise, the EBL 213 forwards it to the BBL 214 which then issues a special sequence requesting the vector on the processor's external bus. The device which generated the interrupt, upon seeing the sequence, returns the vector for the interrupt via the bus. The BBL 214 returns the vector to the DCU 210, which forwards it to the ROB 216, as the data for the special load.

HALT Bus Cycle

Microcode uses store_special_fence to convey this command to the BBL 214. The DTLB 209, DCU 210, and EBL 213 do not act on this command. Microcode issues this command when it enters the halted state. It causes the BBL 214 to issue a special bus sequence indicating to the system that the processor has entered the halted state.

SHUTDOWN Bus Cycle

Microcode uses store_special_fence to convey this command to the BBL 214. The DTLB 209, DCU 210, and EBL 213 do not act on this command. Microcode issues this command when it enters the shutdown state. It causes the BBL 214 to issue a special bus sequence indicating to the system that the processor has entered the shutdown state.

STOPCLK Acknowledge Bus Cycle

Microcode uses store_special_fence to convey this command to the BBL 214. The DTLB 209, DCU 210, and EBL 213 do not act on this command. Microcode issues this command when the STOPCLK pin of the processor is asserted. It causes the BBL 214 to issue a special bus sequence indicating to the system that the processor has accepted the stopclk request and is entering stopclk mode.

SMI Acknowledge Bus Cycle

Microcode uses store_special_fence to convey this command to the BBL 214. The DTLB 209, DCU 210, and EBL 213 do not act on this command. Microcode issues this command when an SMI interrupt occurs. It causes the BBL 214 to issue a special bus sequence indicating to the system that the SMI was accepted.

External Cache Flush Bus Cycle

Microcode uses store_special_fence to convey this command to the BBL 214. The DTLB 209, DCU 210, and EBL 213 do not act on this command. Microcode issues this command when the external caches must be invalidated. It causes the BBL 214 to issue a special bus sequence indicating to the system that any data caches located outside the processor need to be invalidated.

SYNC Bus Cycle

Microcode uses store_special_fence to convey this command to the BBL 214. The DTLB 209, DCU 210, and EBL 213 do not act on this command. Microcode issues this command when the external caches must be invalidated and any data in the modified state must be written back. It causes the BBL 214 to issue a special bus sequence indicating to the system that any data caches located outside the processor need to be invalidated and any modified data in them needs to be written back to main memory.

Branch Trace Message Bus Cycle

Microcode uses store_special to convey this command to the BBL 214. The DTLB 209, DCU 210, and EBL 213 do not act on this command. Microcode issues this command whenever a branch occurs and branch trace messages are enabled. It causes the BBL 214 to issue a special bus sequence indicating a branch trace message. This sequence also specifies the location and target of the branch. For this command, the upper 32 bits of the data associated with the store specifies the location of the branch, while the lower 32 bits specifies the target.

Invalidate DTLB 209 Entry

Microcode uses store_special to convey this command to the DTLB 209. The DCU 210, BBL 214, and EBL 213 do not receive this command, since it is executed by the DTLB 209. It causes the DTLB 209 to invalidate a single entry designated by a field of the linear address for the store_special.

Invalidate DTLB 209

Microcode uses store_special to convey this command to the DTLB 209. The DCU 210, BBL 214, and EBL 213 do not receive this command, since it is executed by the DTLB 209. If the protect global entry (PGE) register of control register 4 (CR4) is set to 0 (i.e., CR4.PGE=0)=0, it causes the DTLB 209 to invalidate all of its entries. If CR4.PGE=1, it causes the DTLB 209 to invalidate all of its entries not marked global.

Flush DCU Entry

Microcode uses store_special to convey this command to the DCU 210. The DTLB 209 does not act on this command, and the BBL 214 and EBL 213 do not receive this command, since it is executed by the DCU 210. It causes the DCU 210 to invalidate a single entry designated by a field of the linear address for the store_special. If the entry contains modified data not in main memory, the value is written to main memory.

RC Flush DCU 210 Entry

Microcode uses store_special to convey this command to the DCU 210. The DTLB 209 does not act on this command, and the BBL 214 and EBL 213 do not receive this command, since it is executed by the DCU 210. It causes the DCU 210 to invalidate a single entry designated by a field of the linear address for the store_special. If the entry contains RC modified data not in main memory, the value is written to main memory.

Invalidate DCU Entry

Microcode uses store_special to convey this command to the DCU 210. The DTLB 209 does not act on this command, and the BBL 214 and EBL 213 do not receive this command, since it is executed by the DCU 210. It causes the DCU 210 to invalidate a single entry designated by a field of the linear address for the store_special. It does not write back any modified data the entry may contain.

Flush L2 Entry

Microcode uses store_special to convey this command to the EBL 213. The DTLB 209 and DCU 210 do not act on this command, and the BBL 214 does not receive this command, since it is executed by the EBL 213. It causes the EBL 213 to invalidate a single Level 2 data cache 217 entry designated by a field of the linear address for the store_special. If the entry contains modified data not in main memory, the value is written to main memory.

Invalidate L2 Entry

Microcode uses store_special to convey this command to the EBL 213. The DTLB 209 and DCU 210 do not act on this command, and the BBL 214 does not receive this command, since it is executed by the EBL 213. It causes the EBL 213 to invalidate a single Level 2 data cache 217 entry designated by a field of the linear address for the store_special. It does not write back any modified data the entry may contain.

Thus, an apparatus and method for requesting special bus cycles and special memory operations according to microcode in a microprocessor is disclosed.

What is claimed is:

1. A microprocessor comprising:

a memory for storing microinstructions, said microinstructions comprising a first microinstruction and a second microinstruction;

plurality of units comprising:

an instruction fetch unit for reading a microinstruction from memory, an address generation unit coupled to said instruction fetch unit, wherein if said microinstruction is a first microinstruction, said address generation unit generating an address at which the microinstruction is to be performed, and if said microinstruction is a second microinstruction, said address generation unit generating an operation address identifying an operation to be performed by a unit of said plurality of units of said microprocessor; and a circuit coupled to said instruction fetch unit for conveying said microinstruction over a bus to the plurality of units of said microprocessor, wherein if said microinstruction is the second microinstruction each of said units of the plurality of units determines whether said operation is to be executed based on said operation address, wherein if said operation is not to be executed by a unit of the plurality of units, said operation is ignored by the unit, and if said operation is to be executed by a unit of the plurality of units, said unit performs the operation specified by said operation address.

2. The microprocessor of claim 1, wherein a unit of the plurality of units ignores said microinstruction, the unit forwards said microinstruction to other units in an execution pipeline for further processing.

3. The microprocessor of claim 1 wherein said second microinstruction comprises an operation which allows said unit to return requested data whenever a result is ready to be committed.

4. The microprocessor of claim 1 wherein said second microinstruction comprises an operation which allows said unit to return requested data whenever a result is ready to be committed, that assures that preceding memory accesses have completed before execution and that assures that subsequent memory accesses wait until said operation completes.

5. The microprocessor of claim 1 wherein said second microinstruction comprises a data field to specify data for said operation.

6. The microprocessor of claim 1 wherein said second microinstruction comprises an operation comprising a data field, said operation assures that preceding memory accesses have completed before execution and that subsequent memory accesses wait until said operation completes.

7. The microprocessor of claim 1, wherein second microinstruction comprises a load special or store special microinstruction and said particular unit determines whether said requested operation is conveyed via a load special or a store special microinstruction, wherein if said requested operation is conveyed via a load special microinstruction, the operation is executed and the requested data is returned as for a normal memory load, and if said requested operation is conveyed via a store special, the address and data provided by the store are used to complete the operation.

8. The microprocessor of claim 1 wherein said second microinstruction comprises a load special, load special fence, or store special fence microinstruction, said operation is completed when a result of said operation can be committed to a system state as soon as said execution has completed, and wherein said second microinstruction comprises a store special operation, said store special operation is completed when a result of said store special operation can be committed to said system state but is executed at a later time.

9. The microprocessor of claim 1 wherein said second microinstruction comprises load special and store special microinstructions which permit memory accesses to be outstanding when said operation specified by said load special and store special microinstructions are executed and a load special fence operation and store special fence microinstruction which do not permit memory accesses to be outstanding when said operation specified by said load special fence and said store special fence microinstruction are executed.

10. The microprocessor of claim 1, wherein operations specified by the operation address include interrupt acknowledge, halt, shutdown, stop clock, system management interrupt, synchronize, and branch trace message bus cycles.

11. The microprocessor of claim 1, wherein operations specified by the operation address include cache flush and invalidate cache bus cycles.

12. A microprocessor capable of generating special bus cycles, said microprocessor comprising:

a storage means for storing microinstructions, said microinstructions comprising a first microinstruction and a second microinstruction;

a means for reading a microinstruction from the storage means;

a means for generating an address corresponding to a requested operation to be performed in response to said microinstruction, wherein if said microinstruction is a first microinstruction, said means for generating an address generates an address at which the microinstruction is to be performed, and if said microinstruction is a second microinstruction, said means for generating an address generates an address identifying an operation to be performed by an unit of said microprocessor; and a means for transmitting said microinstruction having said address to a unit of said microprocessor, such that if said microinstruction is the second microinstruction, said unit determines whether said microinstruction is to be executed based on said address, wherein if said microinstruction is not to be executed, said microinstruction is ignored, and if said microinstruction is to be executed said unit performs the requested operation specified by said address.

13. The microprocessor of claim 12, wherein if said unit ignores said microinstruction, said unit forwards said microinstruction to other units in an execution pipeline for further processing.

14. The microprocessor of claim 12 wherein said second microinstruction comprises an operation which allows said unit to return requested data whenever a result is ready to be committed.

15. The microprocessor of claim 12 wherein said second microinstruction comprises an operation which allows said unit to return requested data whenever a result is ready to be committed, that assures that preceding memory accesses have completed before execution and that assures that subsequent memory access wait until said operation completes.

16. The microprocessor of claim 12 wherein said second microinstruction comprises a data field to specify data for said operation.

17. The microprocessor of claim 12 wherein said second microinstruction comprises a data field and an operation, said operation assures that preceding memory accesses have completed before execution and that assures that subsequent memory accesses wait until said operation completes.

18. The microprocessor of claim 12 further comprising means for determining whether said second microinstruction comprises a load special or store special microinstruction and the operation is conveyed via a load special or a store special microinstruction, wherein if said requested operation is conveyed via a load special microinstruction, the operation is executed and data is returned as for a normal memory load, and if said operation is conveyed via a store special microinstruction, the address and data provided by the microinstructions are used to complete the operation.

19. The microprocessor of claim 12, wherein said second microinstruction comprises a load special, load special fence, or store special fence microinstruction, said operation identified by said second microinstruction is executed when a result of said operation can be committed to a system state as soon as said execution has completed, and wherein said second microinstruction comprises a store special microinstruction, said operation is completed when a result of said store special microinstruction can be committed to said system state but is executed at a later time.

20. The microprocessor of claim 19, wherein said load special and store special operations permit memory accesses to be outstanding when said operation specified by said load special and store special are executed and wherein said load special fence operation and said store special fence operation do not permit memory accesses to be outstanding when said operation specified by said load special fence operation and said store special fence operation are executed.

21. The microprocessor of claim 12, wherein operations specified by the operation address include interrupt acknowledge, halt, shutdown, stop clock, system management interrupt, synchronize, and branch trace message bus cycles.

22. The microprocessor of claim 12, wherein operations specified by the operation address include cache flush and invalidate cache bus cycles.

23. A computer system comprising:
a bus;
a main memory coupled to said bus for storing digital data; and
a microprocessor coupled to said bus for processing said digital data, said microprocessor comprising:
a local memory for storing microinstructions, said microinstructions comprising a first microinstruction and a second microinstruction;
a plurality of units including:
an instruction fetch unit for reading a microinstruction from the local memory;
an address generation unit coupled to said instruction fetch unit, wherein if said microinstruction is a first microinstruction said address generation unit generating an address at which the microinstruction is to be performed, and if said microinstruction is a second microinstruction said address generation unit generating an operation address identifying an operation to be performed by a unit of the plurality of Units of said microprocessor; and
a circuit coupled to said instruction fetch unit for conveying said microinstruction having said address over a bus to the plurality of units of said microprocessor, wherein if said microinstruction is the second microinstruction each unit of the plurality of units determines whether said operation is to be executed based on said address of the second microinstruction, wherein if said operation is not to be executed by a unit of the plurality of units, said operation is ignored by the unit, and if said operation is to be executed by a unit of the plurality of units, said unit performs the operation specified by said operation address.

24. The computer system of claim 23, wherein said unit which ignores said microinstruction forwards said microinstruction to other units in an execution pipeline for further processing.

25. The computer system of claim 23, wherein said second microinstruction comprises an operation which allows said unit to return requested data when a result is ready to be committed.

26. The computer system of claim 23, wherein said second microinstruction comprises an operation which allows said unit to return requested data whenever a result is ready to be committed, that assures that preceding memory accesses have completed before execution and that assures that subsequent memory access wait until said operation completes.

27. The computer system of claim 23, wherein said second microinstruction comprises a data field to specify data for said operation.

28. The computer system of claim 23, wherein said second microinstruction comprises a data field, said operation assures that preceding memory accesses have completed before execution and that subsequent memory accesses wait until said operation completes.

29. The computer system of claim 23, wherein second microinstruction comprises a load special or store special microinstruction and said particular unit determines whether said operation is conveyed via a load special or a store special microinstruction, wherein if said operation is conveyed via a load special microinstruction, the operation is executed and data is returned as for a normal memory load and if said operation is conveyed via a store special microinstruction, the address and data provided by the store special microinstruction are used to complete the operation.

30. The computer system of claim 23 wherein said second microinstruction comprises a load special, load special fence, or store special fence microinstruction, said second microinstrcution is executed when a result of said operation can be committed to a system state as soon as execution has completed, and wherein said second microinstruction comprises a store special microinstruction, said store special microinstruction is completed when a result of said store special microinstruction can be committed to said system state but is executed at a later time.

31. The computer system of claim 23 wherein said second microinstruction comprises load special and store special microinstructions which permit memory accesses to be outstanding when said operation specified by said load special and store special are executed and a load special fence operation and store special fence microinstructions which do not permit memory accesses to be outstanding when said microinstructions specified by said load special fence operation and said store special fence microinstructions are executed.

32. The computer system of claim 23, wherein operations specified by the operation address include interrupt acknowledge, halt, shutdown, stop clock, system management interrupt, synchronize, and branch trace message bus cycles.

33. The computer system of claim 23, wherein operations specified by the operation address include cache flush and invalidate cache bus cycles.

34. In a microprocessor comprising a plurality of units, a method for performing operations comprising the steps of:
   (a) reading a microinstruction from a memory, said microinstruction comprising an address field;
   (b) generating an operation address to be placed in the address field of the microinstruction read from memory, said operation address indentifying an operation to be performed by a unit of a plurality of units;
   (c) transmitting the microinstruction comprising the operation address to a first unit of the plurality of units;
   (d) upon receipt of the microinstruction, said first unit examining the operation address;
   (e) if the first unit is to perform the operation identified by the operation address, said first unit performing the operation;
   (f) if the first unit is not to perform the operation identified by the operation address, said first unit transmitting the microinstruction to a next unit of the plurality of units;
   (g) performing steps (d), (e) and (f) until the operation specified by the operation address is performed.

35. The method as set forth in claim 34, wherein the plurality of units form an execution pipelline, and step (f) comprises transmitting the microinstruction to the next unit in the execution pipeline.

36. The method as set forth in claim 34, wherein if a unit of the plurality of units is to perform the operation identified by the operation address, said method further comprising the step of returning a result value to a predetermined unit of the microprocessor.

37. The method as set forth in claim 34, wherein said microinstruction is a memory access instruction, said method further comprising the steps of:
   prior to transmitting the microinstruction to a unit, determining that prior transmitted memory access instructions have completed execution; and
   waiting to execute subsequently transmitted memory access instructions the unit has performed the operation identified by the operation address in the microinstruction.

38. The method as set forth in claim 34, wherein said microinstruction is a memory access instruction and said microinstruction further comprises a data field, said method further comprising the step of placing data used to perform the operation in the data field in the microinstruction.

39. The method as set forth in claim 34, wherein if said microinstruction is a load special microinstruction, said step of performing the operation identified by the operation address comprising the step of returning data requested by the operation to a unit that receives data retrieved pursuant to execution of a memory load operation.

40. The method as set forth in claim 34, wherein said operations specified by the operation address include interrupt acknowledge, halt, shutdown, stop clock, system management interrupt, synchronize and branch trace message bus cycles.

41. The method as set forth in claim 34, wherein said operations specified by the operation address include cache flush and invalidate cache bus cycles.

42. The method as set forth in claim 34, wherein steps (b), (c), (d), (e) and (f) are performed if the microinstruction is a first type of microinstruction, and if the microinstruction is a second type of microinstruction, said method further comprising the steps of:
   (g) generating an address of a memory operation to be performed as identified by the second type of microinstruction;
   (h) transmitting the microinstruction comprising an address of a memory operation to be performed to a first unit;
   (i) said first unit translating the address of the memory operation to a physical address and forwarding it to a second unit;
   (j) said second unit causing the memory operation to be performed.

43. The method as set forth in claim 42, wherein the first type of microinstruction comprises a load special operation.

44. The method as set forth in claim 42, wherein the first type of microinstruction comprises a load special fence operation.

45. The method as set forth in claim 42, wherein the first type of microinstruction comprises a store special operation.

46. The method as set forth in claim 42, wherein the first type of microinstruction comprises a store special fence operation.

47. The microprocessor as set forth in claim 1, wherein the plurality of units comprises an address translation unit, and if said microinstruction is a first microinstruction, said address translation unit translates the address to a physical address, and if said microinstruction is a second microinstruction, said address translation unit determines whether said operation is not to be executed, said operation is ignored the address translation unit and if said operation is to be executed, said address translation unit performs the operation specified by said operation address.

48. The microprocessor as set forth in claim 12, wherein the plurality of units comprises an address translation unit, and if said microinstruction is a first microinstruction, said address translation unit translates the address to a physical address, and if said microinstruction is a second microinstruction, said address translation unit determines whether said operation is to be executed base on said address, wherein if said operation is not to be executed, said operation is ignored by the address translation unit and if said operation is to be executed, said address translation unit performs the operation specified by said operation address.

* * * * *